INVENTORS
MASAHIDE YAZAWA &
HARUHISA TANI

*J.E. Armstrong*
*Ronald S. Cornell*
ATTORNEYS

INVENTORS
MASAHIDE YAZAWA &
HARUHISA TANI

*J. E. Armstrong*
*Ronald S. Cornell*

Attorneys

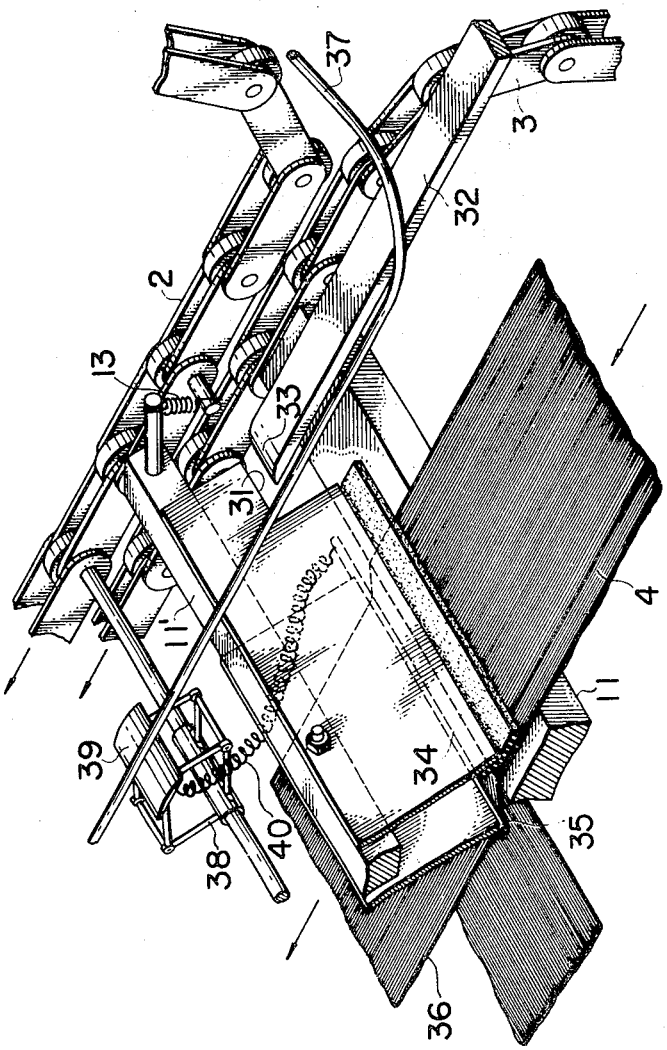

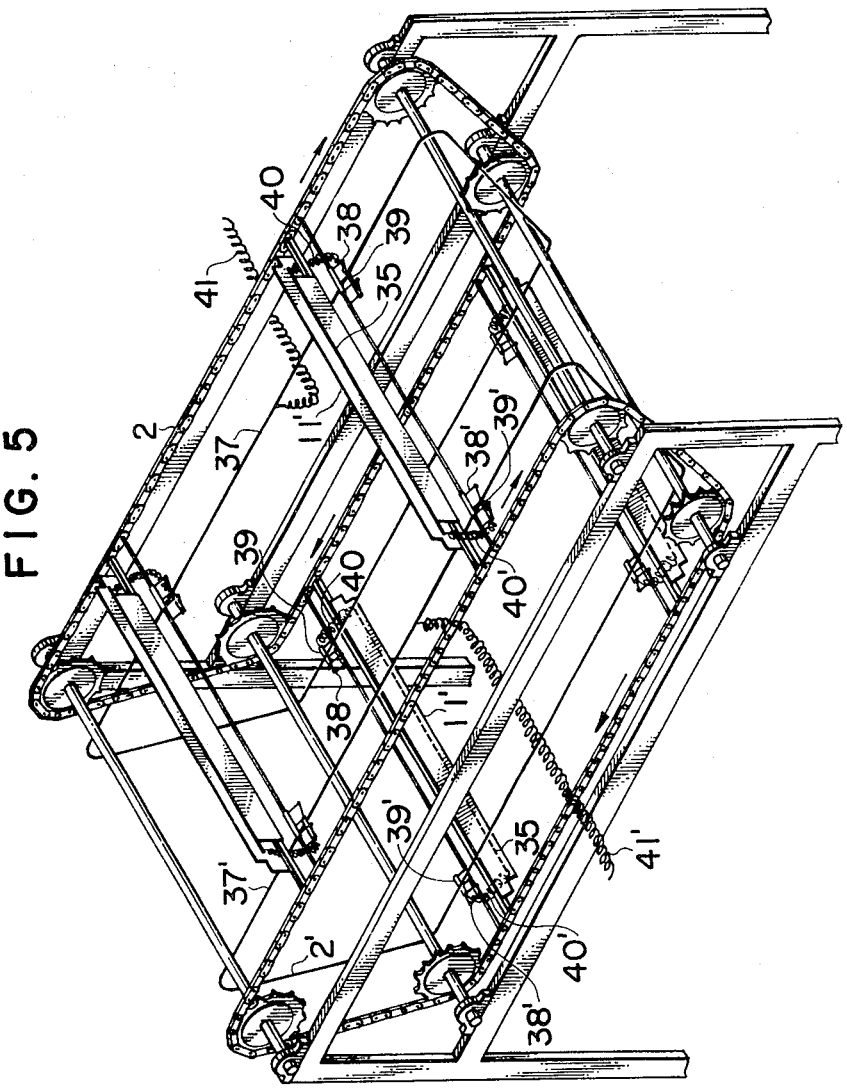

3,669,795
METHOD FOR MAKING A LAMINATED BODY OF PLIABLE THIN LAYER MATERIALS

Masahide Yazawa and Haruhisa Tani, Tokyo, Japan, assignors to Polymer Processing Research Institute Ltd., Tokyo, Japan
Filed Mar. 9, 1970, Ser. No. 17,577
Int. Cl. B32b *31/00, 31/10;* B65c *5/00*
U.S. Cl. 156—265                                7 Claims

ABSTRACT OF THE DISCLOSURE

Method for making a laminated body of pliable thin layer materials obtained wholly or mainly from a uniaxially stretched film piled in lengthwise and crosswise directions which comprises at least one cycle of steps of
(1) supplying a pliable thin layer material obtained wholly or mainly from uniaxially stretched film continuously from the crosswise direction as a weft above another pliable thin layer material running continuously in the lengthwise direction as a warp,
(2) nipping the end of the weft by a pair of holders one from upward and the other from downward at the feeding side of the weft,
(3) moving the nipped weft by a distance substantially equal to the width of the warp in crosswise direction,
(4) cutting the weft into pieces one after another so as to make the length of each piece substantially equal to the width of the warp above the selvage of the warp at the feeding side,
(5) freeing the nipped end of the weft above the other selvage of the warp to allow the cut pieces to fall on the warp, one after another, intermittently to form a piled layer without leaving gaps between each successive weft.

---

The present invention relates to a method and an apparatus for making a laminated body of pliable thin layer materials obtained wholly or mainly from film (hereinafter referred to as thin layer materials) piled in lengthwise and crosswise direction.

The term pliable thin layer material obtained wholly or mainly from uniaxially stretched film as used herein is intended to include: (1) a uniaxially stretched wide film, (2) uniaxially stretched films in a form of narrow tape or of extremely narrow tape-like fibers, (3) a network structure of partially slitted or fibrillated continuous film made from a stretched wide one (hereinafter partially slitted or fibrillated continuous film is denoted as split fiber web), (4) split fiber webs made from uniaxially stretched narrow film, and the term "thin layer arranged lengthwise in a definite width" hereinunder-mentioned denotes a number of those described in (2) and (4) arranged in parallel within a definite width, or network structure of split fiber web (3) made from wide film and spread to a broader definite width than their original width, or composite bodies of thin layer of (1), (2), (3) or (4) fixed with a binder in a form of solution or emulsion having a softening (melting) point lower than that of the stretched film followed by drying or fixed with a binder shaped in a film or fiber form.

In order to simplify the terms used hereinafter the thin layers for lengthwise and crosswise directions are abbreviated merely as warp and weft, respectively.

Recently a laminated body of pliable thin layer materials obtained wholly or mainly from a film has been required in commerce for example in the fields of non-woven fabrics, packaging materials or reinforcing material therefor. However, a method and an apparatus which are commercially acceptable in the point of efficiency etc. have, heretofore, never been known.

It is an object of the present invention to provide a method for making a laminated body of pliable thin layer materials obtained wholly or mainly from stretched films with commercially acceptable efficiency. It is another object of the present invention to provide an apparatus for making a laminated body of pliable thin layer materials obtained wholly or mainly from stretched films with commercially acceptable efficiency.

The objects can be attained by a method and apparatus of the present invention wherein a pliable thin layer material from a uniaxially stretched film of a definite width, while it is running horizontally in the lengthwise direction, is supplied continuously from the crosswise or oblique direction with pieces of similar pliable thin layer materials from a uniaxially stretched film by steps of nipping the end of a piece of the crosswise layer with a circulating holders, both the ends of which are connected to circulating chains, and moving the said piece onto the lengthwise layer by the distance equal to the width of the lengthwise layer, cutting the crosswise piece at its feeding side so as to give a length equal to the width of the lengthwise pliable thin layer material and at the same time freeing the forward nipped end of one or more pieces of crosswise layer so as to be piled on the lengthwise layer intermittently and without leaving gaps between successive pieces and further fixing the bond of the resultant compositive body with an adhesive binder applied in advance. When both the kinds of thin layers having no adhesive binder (hereafter referred to as "binder" for simplicity) attached in advance are used, some binder is applied on them and after drying they are bonded by a heat-press during the process of this invention. It is desirable that both the pliable thin layer materials or at least the crosswise pliable thin layer material is fixed with some binder in advance, because in this case a laminated body can be made simply by heat-pressing after being piled up.

With reference now to the drawings, there is shown an example of the equipment for the practice of this invention.

FIG. 1 shows the elevation of an example of the apparatus of the present invention in which there is shown three pairs of holders composed of upward and downward ones, both the ends of which are fixed at equal intervals to circulating chains on the way of warp running continuously in the direction vertical to the paper surface and a pair of the holders for the weft which come together from upward and downward, hold the weft and travel over the warp. The weft is cut into pieces as long as the width of the warp, and the pieces are put on the warp intermittently to form a lengthwise and crosswise laminated body without forming a gap between each successive piece.

FIG. 4 is the half-cut oblique view of the holder in the apparatus, in which the distance between each pair of holders which circulate at a speed substantially equal to the feeding speed of the left, is equal to the piece of the weft; the said holder is fixed with a melting cutter in front of it; the weft end is freed from the preceding holder, at the same time the weft tail end is melt-cut by the melting cutter fixed to the succeeding holder; and then the cut piece of the weft falls on the warp by aid of suction.

FIG. 5 shows an example of the mechanism for supplying electricity to the melting cutter.

Figure 1:
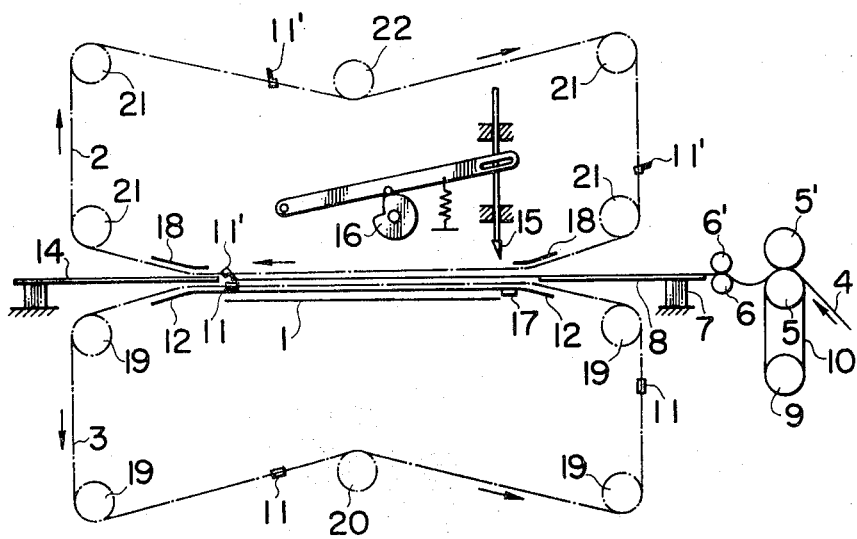

In FIG. 1 across the warp 1 running continuously in the direction vertical to the paper surface, one or more pairs of upward and downward circulating holders, both the side ends of which are connected to the circulating driving chains (or belt), are combined together above the warp 1 after coming from upward and downward, and while holding the weft at its forward end between them, move horizontally in the weft direction. The distance between the two up- and downward pairs of the circulating chains lying in parallel, to which both the ends of one or more pairs of these upward and downward holders are connected, is wider than the width of the weft. However, the figure shows only the elevation. The weft 4 is continuously drawn out by means of pinch rollers 5, 5', and passes through brake rollers 6, 6' (brake bars may be used instead, though not shown in the figure) which are rotated by the movement of the weft, and the forward end of the weft comes on a panel 8 fixed on a support frame 7. The panel 8 is not always necessary. In case of the absence of the panel 8, the end part of the weft hangs down forward from 6, 6' and the hanging part first caught by the downward circulating holder 11, may come to be held between 11 and the upward circulating holder 11'. During the time when the weft is not kept between the holders 11 and 11' and the weft movement is not started, the weft drawn out from 5, 5' remains between 5, 5' and 6, 6' as shown in FIG. 3(a). When the remaining amount is large, it is possible to fix a belt 10 between 5, 5' and a roller 9, in order that the thin layer of the weft which is readily electrostatically charged may stick on the belt 10. When, however, a number of pairs of holders are fixed with a distance wider than the width of the warp on the circulating upward chain 2 and downward chain 3, the shorter the distance of each pair of holders becomes, i.e. on the nearer it approaches the length of the weft to be put on the warp, the less becomes the remaining amount of the weft between 5, 5' and 6, 6'. It can be reduced to zero as in the case of FIG. 4, which will be later explained. In FIG. 1, there is shown the case in which three pairs of weft holders 11 and 11' are fixed at equal intervals from each other on the upward and downward circulating chains. FIG. 3(a) shows the very instant in which the cut end of the weft on the horizontal panel 8 is nipped by the upward circulating holder 11' owing to the pressure of a coil-spring 13, as shown in enlarged scale in FIG. 2, and the held weft moves while sliding on a fixed panel and the downward circulating holder 11, guided by a chain rail 12 at the end, starts horizontal motion just before the warp selvage and holds the weft from downwards after passing the end of the panel. After passing the panel end, the weft, the end of which is held between the upward and downward holders, moves horizontally over the warp in accordance with the motion of the holders as shown by the arrow mark. When the upward holder 11' touches the end of the fixed panel 14, the holder is kicked up and the weft is freed from holding as shown in FIG. 3(b). At this time, since the weft, which has been passing between the nip of the feeding rollers 5, 5' and sliding between the brake rollers 6, 6', rotated by the movement of the weft, is held and moved at a rate faster than that at which it is continuously supplied from 5, 5', the retained part of the weft is reduced to nothing when the holder reaches above the other selvage of the warp. When the weft is freed, at this time, the weft end slides on the advancing downward holder 11, and falls on the selvage of the warp. This can be done by placing the end of the kicking plate at a proper position. Almost at the same time or just before the held weft end is freed, a cutting equipment, for example, an electric heat melting cutter 15, situated above the warp selvage at the weft feeding side, is made to fall instantaneously and intermittently as shown in FIG. 3(c) by means of a suitable mechanism, for example, a cam 16 linked to the chain as shown in FIG. 1 or (this may be linked by a mechanism such as an electromagnet) to cut the weft, directly or if necessary by installing a receiving table 17 of the melting cutter. Then the tail end of the weft falls on the selvage of the warp just below. The timing of cutting is determined by the travelling speed of the holders and the supply speeds of the warp and weft. If the receiving table 17 is maintained at a high temperature with a suitable heating means there is no need of the bar 15 being electrically heated.

Cut pieces of the weft may be allowed to fall only by gravitation when the operation speed is slow, but when the operation speed is high, a better result can be obtained by setting up a vacuum suction box under the warp (which is not shown in the figure), in order to ensure a quick fall. This prevents the disorder of the weft due to the turbulent air or electrostatic charge which tends to be generated in the thin layer body by the high speed motion of the successive wefts.

Figure 2:
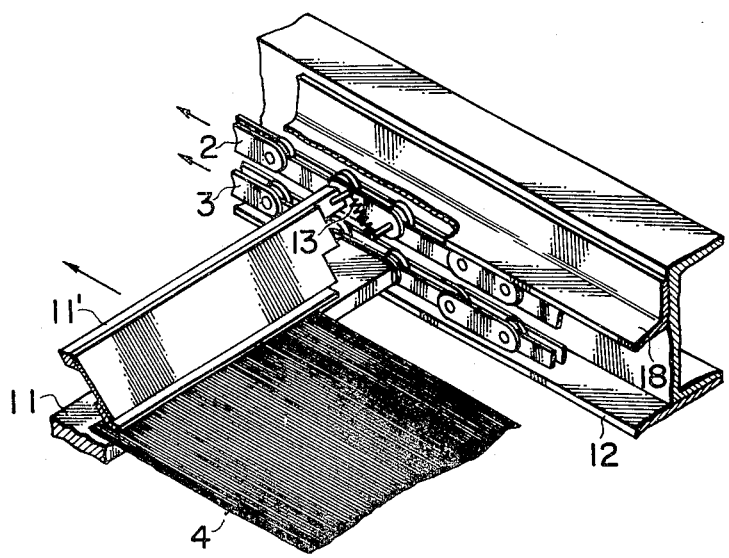
FIG. 2 shows the half-cut oblique view of the holding part having a coil-spring at its supporting part, in order to ensure the holding of the weft, when a pair of holders, upward and downward, come together, and travel horizontally while holding the weft.
Figure 3A:
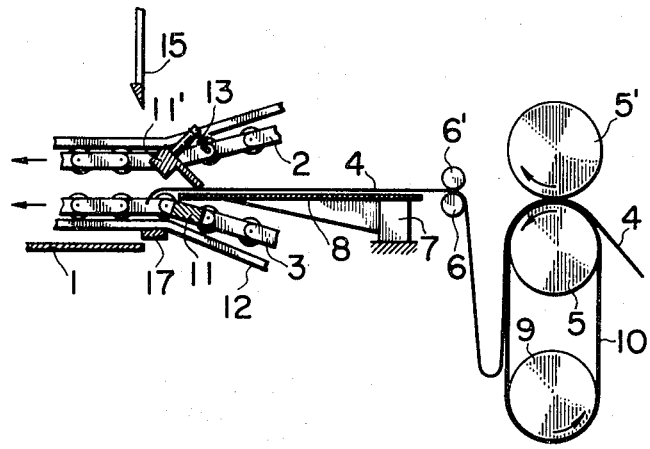
FIG. 3(a) shows the side elevation of a part of the present apparatus at the instant in which the circulating holder holds the weft end between the holder and the fixed plate at the feeding side.
Figure 3B:
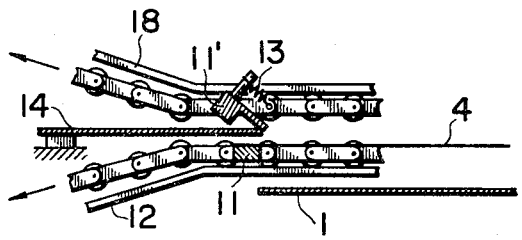
FIG. 3(b) shows the same at the instant in which the weft end is freed, when the upward holder is kicked up by the fixed plate near the other selvage of the warp.
Figure 3C:
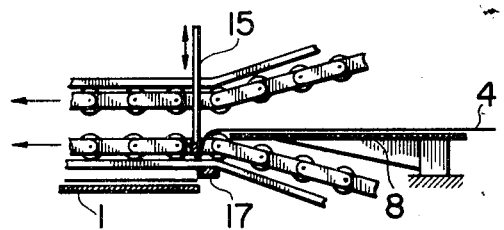
FIG. 3(c) shows the same at the instant in which the whole length of the weft is melt-cut above the selvage at the feed side by a melting cutter and at the same time the weft end is freed.

For the horizontal movement of the holders over the warp, the upward and downward chains 2, 3 move between the rails 12, 18 that cover the whole width of the warp horizontally, in case of FIG. 2 while only the downward rail 12 is installed to cover the whole width in case of FIG. 1. In this case there is the upward rail 18 only in a certain length of the curved part as a guide rail of the circulating route for the chain. If the chains are heavy enough and if only the downward chain is driven and moves on a horizontal rail, the upward chain will travel horizontally together being mounted on the downward chain because of its own weight, and thus the holding power is not weakened. Accordingly the rail for the upward chain is not always necessary.

The downward chain 3 is driven by chain-wheels 19 at the same time changing the direction and a chain-wheel 20 for regulating the tension; and the upward chain 2 is driven by chain-wheels 21 at the same time changing the direction and a chain-wheel 22 for regulating the tension.

As for the end surface of the upward holder 11', a surface of an elastic material like sponge rubber or a structure of the latter covered with a thin film will ensure holding, while in most cases it is advantageous for the surface of the downward holder 11 to be covered with fluoroethylen polymer in order to allow good slipping.

The spring 13 is not necessary when the end of 11' has an attached thin, flexible rubber plate.

FIG. 4 is a half-cut oblique view of the holder showing the changed state of the equipment in the extreme case in which the distance between the two successive holders is substantially equal to the cut length of the piece of the weft that falls, when a number of weft holders are attached at equal intervals to the circulating chains of FIG. 1. In this case the travelling speed of the circulating chains is substantially equal to the necessary feeding speed of the weft as calculated from the warp speed and the weft width. Therefore, the weft will not be retained between 5, 5' and 6, 6' of FIG. 1 and the weft is held by two successive pairs of holders although it is for a very short period of time just before cutting. In this case it becomes impossible to work melting cutter at a fixed position. Accordingly, a melting cutter which is fixed to the front of the holding part of the weft, and travels around together with the holder is suitable for use. The electric current for the melting cutter is led from the wire through a current collector as shown in FIG. 5.

Now let us have a look at FIG. 4 and FIG. 5. During the time when the bottom of the cut-out part 31, which is made at both the side ends of the holding plate of the holder 11', is supported on the rail 32 at the feeding side, the holder is kept at the kicked up position, so that the holder moves forward without holding the weft. But at the moment the cut-out part goes off the end 33 of the rail 32, 11' slides down on 11 by the elasticity of a coil-spring 13, and the thin rubber plate 34 attached to the end of 11' bends and holds the weft by its elasticity. At this moment, the melting cutter 35, fixed to the supporting frame of 11' and located just before the holding part, touches the weft across its whole width, and cuts the preceding tail-end of the weft by melting. At this time, if the end 33 of the rail is located backward in such a way that the distance between the end 33 of the rail and the warp selvage of weft feeding side corresponds to the necessary melt-cutting time, the tail-end of the cut weft piece falls just on the right selvage, being melt-cut during the continuous travel. Further, if the held end of the weft 36 is freed on the left selvage, the cut weft falls to pile up on the warp. To the melting cutter 35 which circulates together with the holder, the electric current is supplied from wires 37, 37' through collectors 39, 39' having pantagraphs 38, 38', and through the wiring 40, 40' which pass through the holder. As for supply of electricity to the wire, there is no fear for the crossing of the wirings and the chains, when wiring 41, 41' which pass the side free space in the circulating route of the chains 2, 2' are used as shown in FIG. 5.

The melting cutter may be attached to the downward holder. As for the way how it is attached and the way how it works, it should be appreciated that other suitable ways than those shown in the figures may be adopted.

In the case of FIG. 4, the supply speed of the weft and the travelling speed of the holder should be completely the same, but in the case in which these two speeds cannot be made exactly the same on account of the relation of the driving mechanism, the travelling speed of the holder should be set up to be a little faster than the supply speed of the weft, and the weft should be held in very lightly. This will cause slipping of the weft at the holding part to the extent corresponding to the difference of the speeds. In this way, the trouble of the speed difference can be eliminated every time, or, by detecting the speed difference of the two, the feeding speed of the weft may be regulated. Anyway, the travelling speed of the holder is required to be equal to or a little faster than that of the feeding speed of the weft. When the travelling speed of the holder is fast enough and the weft is fed at such a slow rate that sufficient time can be taken in cutting with a melting cutter at a definite position, it is possible to operate with an equipment as shown in FIG. 1. A minimum required time for melt-cutting may make the use of the fixed melting cutter impossible in a high speed operation. However, an improvement of operation will be attained by adopting the method in which the melting cutter is attached in front of the holder and the melting cutter circulates together with the holder as shown in FIG. 4. If the melting cutter is kept in contact with the weft so much backward from the right selvage of the warp that the required time for melt cutting can be taken, the tail end of the weft melt-cut above the warp selvage and sucked, falls down on the latter. Thus any required high speed operation becomes possible. Of course, in accordance with the cutting of the tail-end of the weft, the top-end is also freed, and the cut piece of the weft is sucked down and falls on the warp so as to cover the latter.

In the figure there is shown a manner in which the holders are fixed on two pairs of the upward and downward circulating chains and one pair of the upward and downward holders are combined above the warp to nip the weft. However, this invention is not limited within this manner. It is to be understood that for example, the following cases are within the scope of this invention; a case in which a holder attached to a single pair of upward (or downward) circulating chains nips singly a weft above one selvage of a warp and makes the former free above the latter for example, a magnetized holder attached to one pair of upward circulating chains nip the weft above one selvage of a weft by attracting a narrow iron plate from downward, the iron plate is drawn off mechanically to fall down over the other selvage and the fallen iron plate is sent back to the feeding side passing under the warp to be circulated again: still another case in which the above work is carried out electrically, etc.

These methods give the same result essentially. Therefore these are naturally within the scope of this invention. Following examples illustrates the practice of this invention.

EXAMPLE 1

Two sheets of a network structure of split fiber webs were obtained by splitting two parallel sheets of high density polyethylene film 0.002 mm. thick and 350 mm. wide, which had been stretched 9 times lengthwise the original length of the film. The above web sheets were heat-treated on a steam drum for 2 seconds at 120° C. Then, the adjoining selvages were put in contact by using a guide roller, and in order to join them, a small quantity of an adhesive of hot-melt type vinyl-acetate-ethylene copolymer having a melting point of 80° C. was applied on the contacting selvages. Thus one sheet of split fiber web of about 700 mm. in width was obtained. Then the web was introduced into a flat air draft duct, and was spread by an air current passing through a duct to 1,400 mm. in width. The air was ejected tangentially to the upward pinch roller to leave to the same direction, while only the spread web was drawn along the circumference of the roller. A part of the downward roller was dipped into an emulsion of a vinylacetate-ethylene copolymer having a concentration of 30%. The web was sized with the emulsion between the pinch rollers, and both the surfaces of the sized web was dusted with a small quantity of an inorganic powder e.g., talc which is available in the market. Then it was dried on fluoroethylene polymer coated steam driers; its width was prevented from shrinking as little as possible by use of expanders. Thus a resultant thin layer web of split fibers, 1350 mm. wide and having an amount of split fibers of 10 g./m.$^2$, and sizing agent of 2 g./m.$^2$, was reeled up. This is the raw material of thin layer web to be put into practice in the apparatus of FIG. 1 of this application.

While from one roll of this thin web, a warp was supplied continuously lengthwise and in the horizontal direction at a speed of 32.4 m./min., from the other roll was supplied wefts continuously from the crosswise direction, through the nip between the rollers 5, 5' at a speed of 33 m./min. The whole circumference of the chain 2, 3 was 6.3 m. long. Four pairs of the holders 11, 11' were mounted on chains at four equal intervals; therefore the distance between each center of successive holders was 1.58 m. The chain was driven to circulate 6 times a minute to give a chain speed of 37.8 m./min. While the chain made one round, wefts were cut off four times to fall down. A cut piece of the weft was made to be a little longer than the width of the warp. During the interval of each falling of the weft, the warp ran 1350 mm., and cut pieces of the weft were intermittently supplied on the warp to pile on, without forming a gap between each successive piece. A suction box of reduced pressure under the warp sucked down the cut pieces of the weft to stick it on the warp. The warp with the cut pieces on it was supplied by pinching with a contact guide roller on the first one of two steam drums coated with a fluorine containing resin, 1.8 m. in diameter and 1.5 m. in width, at 100° C., in such a way that the weft web comes between the drum surface and the warp. When it went off the second roller, it was pressed by a rubber roller, 30 cm. in diameter, to stick the laminated body together. Thereafter, it was air-cooled. Thus a warp-weft laminated body having an amount of split fibers of 20 g./m.$^2$ and sizing agent of 4 g./m.$^2$ was obtained at a speed of 32.4 m./min. It was found easy to rewind if talc powder was dusted on it at the time of winding.

EXAMPLE 2

A sheet of tubular polypropylene film, quenched by cooling water was stretched 9 times the original length under steam heating. Thereafter, it was cut lengthwise into two sheets of uniaxially stretched film of each 500 mm. in width and 0.02 mm. in thickness. They were passed in parallel through guide bars to a heating drum at 145° C. to undergo heat treatment for 2 seconds. Then each sheet was wound on a reel. Two sheets, each 500 mm. wide, were unwounded in parallel to pass on comb-formed slitting cutters, each having 100 razor blades mounted at a 5 mm. pitch. Thus 200 tapes, each 5 mm. in width, were prepared, which were passed through a comb of a 6 mm. pitch to spread it out into 1200 mm. in total width, and they were arranged lengthwise in parallel. Following this, a sheet of unstretched polypropylene film, 1200 mm. wide and 0.025 mm. thick, was put on the above-mentioned arranged tapes. The piled layer thus obtained was pressed at 130° C. In this way was obtained a thin layer of warped stretched tapes bound with the unstretched film. This was wound up for a while to be used for the weft. On the other hand, 200 tapes, each 5 mm. wide arranged in parallel and warped in 1200 mm. width in total, obtained in the same way as in case of the weft, were used for the warp. The thus obtained two layers were piled one over the other as in Example 1. In this case, the weft was introduced in such a way that the unstretched film was sandwiched between the warp and the weft tapes. While the warp was running by a length of 1.2 m., one sheet of the weft 1.2 m. wide was piled thereupon. By heat-pressing was obtained a sheet of non-woven piled body of uniaxially stretched tapes in the warp and the weft directions. This non-woven body was less expensive than fabrics woven from tapes and had a high tenacity in both the warp and the weft directions.

A modification of Example 2 may be done as follows: For the warp, 200 tapes, each 5 mm. wide, were arranged lengthwise in a 6 mm. pitch. On two sheets of stretched film 500 mm. wide put side by side in parallel without cutting in tape form, an unstretched film 1 m. wide as a binder was piled and pressed to form a thin layer for the weft. Sucked down from below the warp, the weft was piled on the warp and a laminated body was made.

In general, a laminated body with warp and weft made from uniaxially stretched film is characterized by an extremely high tearing strength compared with a biaxially stretched one.

Another modification of Example 2 was obtained as follows:

Tapes from a sheet of stretched film were split to form tapes of split fibers. They were arranged lengthwise to have a width of 1.2 m. on which an unstretched film was piled and pressed. This layer was used for the weft. For the warp, similar split fiber tapes were used. Thus a laminated body with warp and weft from split fibers was made.

In any case, it is advantageous to fix at least the arrangement of the weft by some binder to prevent the stretched material from being disordered on cutting.

Further, in Example 1, if the width of uniaxially stretched film is 700 mm., a split fiber web 700 mm. wide is obtained after splitting. When it is spread flat into a width two times the original, a spread split fiber web 1350 mm. wide can be obtained at a single operation. In most cases, a split fiber web from uniaxially stretched film as wide as possible is advantageous because the process is simple and the fiber density is even.

Further, in Examples 1 and 2, if the content of the weft is required to be two times as much as that of the warp, a weft material with twice the thickness or density is used, or on the falling of wefts on a warp, a weft is arranged to cover only a half an area of the preceding weft. High tenacity of the weft direction is often required for packing the bag materials.

For uniaxially stretched materials used in this application, stretched materials of all kinds of fiber-forming polymers for example high density polyethylene, polypropylene, polyvinyl-chloride or -alcohol etc. may be used, and preferable materials used for the binder are the group of the polymer or derivatives thereof, prepared wholly or partly from the same monomer as that of the polymer of the stretched material having high affinity to the stretched materials.

What is claimed is:

1. A method for making a laminated body of pliable thin layer materials piled in lengthwise and crosswise direction which comprises at least one cycle of steps of
   (1) supplying a pliable thin layer material continuously from the crosswise direction as a weft above the other pliable thin layer material running continuously in the lengthwise direction as a warp,
   (2) nipping the end of the weft by a pair of holders, one from upward and the other from downward, at the feeding side of the weft,
   (3) moving the nipped weft by a distance substantially equal to the width of the warp in crosswise direciton,
   (4) cutting the weft into pieces so as to make the length of each piece substantially equal to the width of the warp at above the selvage of the warp at the feeding side,
   (5) freeing the nipped end of the weft at above the other selvage of the warp to allow the cut pieces to fall on the warp, one after another, intermittently to form a piled layer without leaving gaps between each successive weft.

2. A method of claim 1, wherein said pliable thin layer material is a broad uniaxially stretched film.

3. A method of claim 1, wherein said pliable thin layer material is numbers of uniaxially stretched films arranged in parallel to each other within a definite width.

4. A method of claim 1, wherein said pliable thin layer is a broad split fiber web spread to a definite width broader than the original width thereof.

5. A method of claim 1, wherein said pliable thin layer material is a number of split fiber webs arranged in parallel to each other within a definite width.

6. A method of claim 1, wherein at least one of two kinds of pliable thin layer material, the warp and the weft, is treated with an adhesive binder.

7. A method of claim 1, wherein a film of an adhesive binder is inserted between the warp and the weft.

References Cited

UNITED STATES PATENTS

| | | | |
|---|---|---|---|
| 3,322,591 | 5/1967 | Cleverly | 156—297 |
| 3,300,366 | 1/1967 | Krolik, Jr. | 161—402 X |
| 3,428,506 | 2/1969 | Johnstone | 156—250 X |
| 3,511,735 | 5/1970 | Lindley | 156—264 X |
| 3,574,038 | 4/1971 | Wolfe | 156—264 X |

ALFRED L. LEAVITT, Primary Examiner

K. P. GLYNN, Assistant Examiner

U.S. Cl. X.R.

156—250, 256, 303; 161—402